United States Patent [19]
Banavong et al.

[11] Patent Number: 5,640,424
[45] Date of Patent: Jun. 17, 1997

[54] DIRECT DOWNCONVERTER CIRCUIT FOR DEMODULATOR IN DIGITAL DATA TRANSMISSION SYSTEM

[75] Inventors: Noi N. Banavong, Corona; George Gomez, Montebello; Long Quoc Nguyen, Laguna Hills; Dan Q. Tu, San Diego, all of Calif.

[73] Assignee: Interstate Electronics Corporation, Anaheim, Calif.

[21] Appl. No.: 442,510

[22] Filed: May 16, 1995

[51] Int. Cl.$^6$ .................................................. H04L 27/06
[52] U.S. Cl. .......................... 375/316; 375/345; 455/234.1
[58] Field of Search .................................. 375/316, 345, 375/340, 344; 455/234.1, 232.1, 208; 330/254; 329/302, 306

[56] References Cited

U.S. PATENT DOCUMENTS

| | | | |
|---|---|---|---|
| 3,879,664 | 4/1975 | Monsen | 375/347 |
| 4,604,645 | 8/1986 | Lewis, Jr. | 358/27 |
| 4,660,196 | 4/1987 | Gray et al. | 370/109 |
| 4,893,316 | 1/1990 | Janc et al. | 375/321 |
| 4,903,279 | 2/1990 | Murakami et al. | 375/200 |
| 5,019,910 | 5/1991 | Filmer | 358/188 |
| 5,095,533 | 3/1992 | Loper et al. | 455/245 |
| 5,140,703 | 8/1992 | Payne | 455/226.1 |
| 5,179,730 | 1/1993 | Loper | 455/266 |
| 5,191,305 | 3/1993 | Frost et al. | 333/202 |
| 5,223,842 | 6/1993 | Okurowski et al. | 342/201 |
| 5,230,011 | 7/1993 | Gelis et al. | 375/344 |
| 5,375,146 | 12/1994 | Chalmers | 375/344 |
| 5,451,899 | 9/1995 | Lawton | 375/324 |

*Primary Examiner*—Stephen Chin
*Assistant Examiner*—T. Ghebretinsae
*Attorney, Agent, or Firm*—Calfee, Halter & Griswold

[57] ABSTRACT

A digital downconverter circuit for a digital data transmission system is provided, comprising (i) a bandpass filter circuit for filtering a received analog intermediate frequency (IF) carrier signal onto which baseband information has been modulated, and outputting a bandpass analog IF signal; (ii) an analog-to-digital converter for converting the bandpass analog IF signal into a bandpass digital IF signal; (iii) a phase shifter device for outputting a complex pair of phase shifted baseband signals operating at a local baseband frequency; (iv) a mixer device for mixing the bandpass digital IF signal separately with each of the complex pair of phase shifted baseband signals and outputting a complex combined baseband/bandpass signal comprising inphase and quadrature components; (v) filtering circuitry for recovering the baseband information onto the phase shifted baseband signals; and (vi) sampling circuitry for sampling the information-bearing recovered baseband signals and outputting a sampled complex baseband output signal. The phase shifter device, the mixer device, the filtering circuitry, and the sampling circuitry are all implemented on a gallium arsenide (GaAs) application specific integrated circuit (ASIC). The filtering circuitry includes a single half-band pre-filter and a multi-pole low pass filter. The analog-to-digital converter operates at the sampling clock frequency, which is about 512 megahertz (MHz), and the IF carrier signal operates at about 52–176 MHz. An automatic gain control circuit controls the amplitude of the bandpass analog IF signal prior to its being converted into the bandpass digital IF signal.

27 Claims, 8 Drawing Sheets

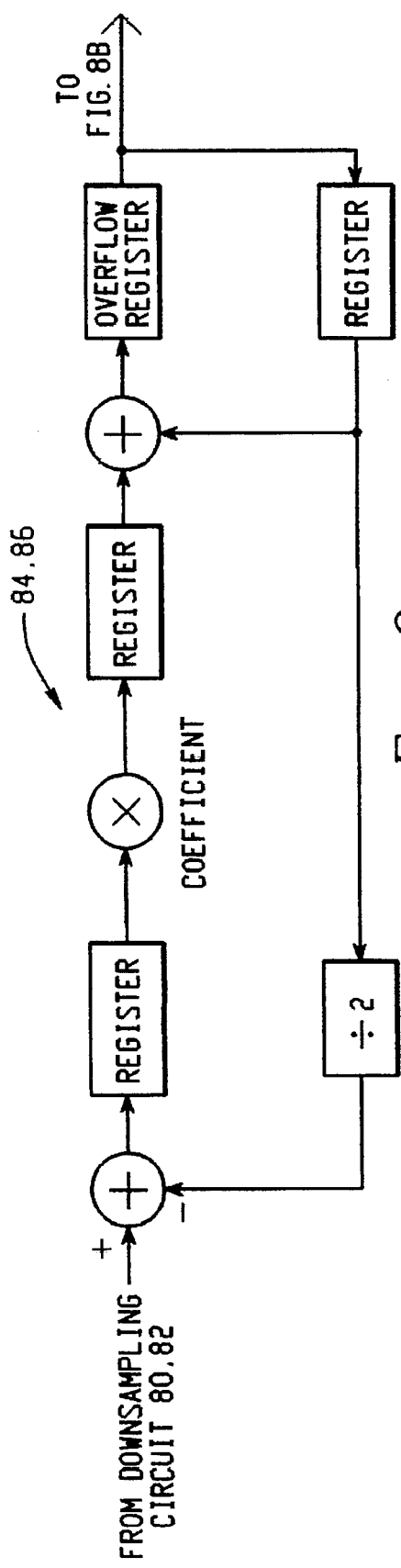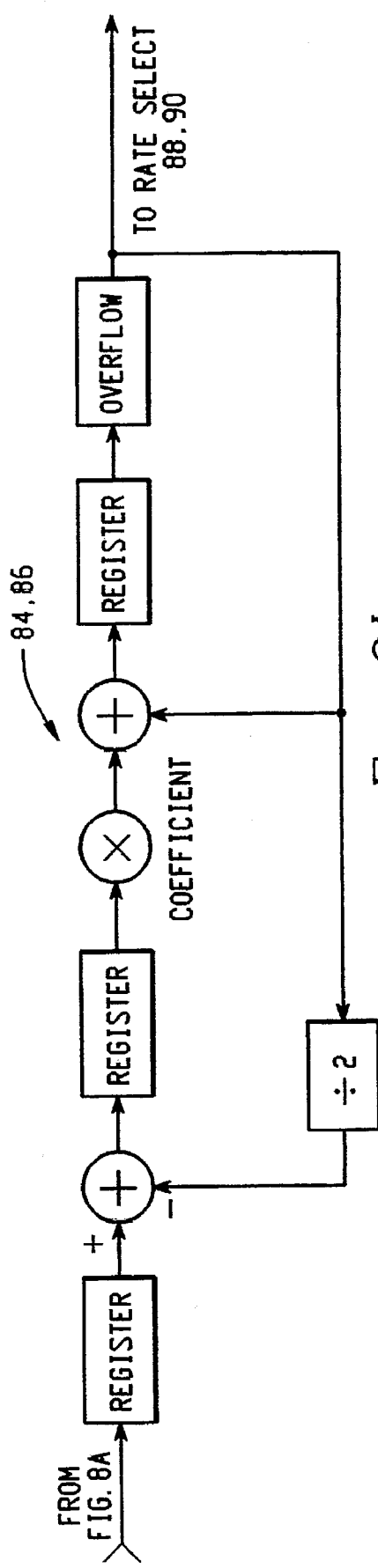

DIRECT DOWNCONVERTER CIRCUIT FOR DEMODULATOR IN DIGITAL DATA TRANSMISSION SYSTEM

FIELD OF THE INVENTION

The present invention relates generally to digital data transmission systems and more particularly to filtering circuitry for shaping digital data pulse trains in demodulators in such systems.

BACKGROUND OF THE INVENTION

The use of orbiting satellites is an integral part of today's worldwide communications systems. As the technology and hardware of such systems continues to advance significantly, it is expected that satellites will continue to play an ever-increasing role in the future of long-range communications. Each new generation of satellites has been more technologically sophisticated than its predecessors, and each has had a significant impact on the development and capabilities of military, domestic and international communications systems. This progress is expected to continue as new developments in satellite communications systems occur in the future.

Today's satellite systems can perform a wide variety of functions, besides the basic operation of completing a long-range communications link. For example, satellite systems may be used for navigation and position location, weather monitoring, terrain observations, and deep-space exploration, and are an integral part of wide area distribution networks. Other, even more sophisticated uses for satellite systems are being investigated.

A satellite communications system may take on several different forms. Typically, such systems comprise an uplink from a ground-based earth station to a satellite, and a downlink from the satellite back to another earth station. Ground-based earth stations may be designated as a transmitting station only, or a receiving station only, but more commonly these ground-based earth stations are designated as transmitting-receiving stations.

The internal electronics of an earth station are conceptually quite simple. In a transmitting portion of a source station, baseband information from a user information source, such as a telephone, television, facsimile or computer, are brought in on cable or microwave link from the various sources. The baseband information is then multiplexed (combined) and modulated by a modulator onto a sinusoidal intermediate frequency (IF) carrier signal.

The IF carrier signal is typically a bandpass signal which facilitates data transmission to a much greater extent than a baseband signal and is therefore the preferred signal format in long range data satellite communications systems. The modulator of the source station functionally operates to shape the baseband data signal and combine the resulting shaped signal with the sinusoidal IF carrier signal to provide a data bearing information signal operating at the carrier frequency. Shaping is performed to provide the data bearing signal appropriate spectral properties which facilitate transmission.

The data bearing IF carrier signal is then translated to radio frequencies (RF) for power amplification and transmission through the atmosphere to the satellite. The satellite receives the RF signal from the source earth station and amplifies and conditions the signal. The satellite then relays the amplified and conditioned signal to a receiving portion of a receiving earth station.

At the receiving station, the RF signal is first translated back to IF. At the IF, uplink data bearing carrier signal is typically further filtered and then demodulated by a demodulator to recover the baseband source waveforms. The demodulator at the receiving station reverses the process performed by the modulator at the source station by recovering the originally transmitted baseband signal from the carrier frequency.

The demodulator located within the receiving portion of the receiving station typically includes a downconverter which is a device that converts the higher frequency of the RF-to-IF translated signal to a lower frequency by mixing it with a local baseband frequency. The mixing process, known as heterodyning, produces frequencies corresponding to the sum and the difference of the two original frequencies. The output of the downconverter is the difference, or lower frequency, signal. The downconverter thus converts a bandpass signal to a baseband signal for further processing by the demodulator.

FIG. 1 shows the implementation of a known downconverter for a satellite communications system. The construction and operation of the known downconverter is as follows. The received analog IF bandpass signal is received by a series of bandpass filters 1 which filter the signal to eliminate unwanted signal variations which may have been introduced during transmission of the RF signal from the satellite through the atmosphere to the receiving station, or during translation of the RF signal to the IF signal. The bandpass filters may be constructed as shown in U.S. Pat. No. 5,191,305 to Frost, et al., incorporated by reference herein. An automatic gain control circuit 2 is employed to provide a consistent signal to an analog mixer configuration comprising a carrier frequency source 3, a phase shifter 4 and a pair of mixers 5a–5b.

The output of the mixers is a baseband signal comprising a real or inphase part (I) and an imaginary or quadrature part (Q). The baseband signal is recovered from low pass filters 6a and 6b, respectively, and digitized by analog-to-digital (A/D) converters 7a and 7b, respectively. The digitized baseband signal may then be further processed by the demodulator, for example by further filtering the digitized signal.

Known downconverter circuits such as the one shown in FIG. 1 are typically implemented in analog hardware. For example, see U.S. Pat. No. 5,179,730 to Loper. In such known downconverter circuits, the processes of signal mixing, signal filtering, and automatic gain control are all performed prior to converting the signal into a digital format. The received bandpass signal is converted to digital format only after being initially filtered, mixed with a baseband frequency to separate the signal into its inphase and quadrature components, and filtered to recover the baseband signal.

Such extensive use of analog circuitry in constructing a direct downconverter inherently results in device deficiencies. For example, instability associated with analog signal drift is common with such circuits. In addition, power required by analog circuitry is typically greater than the power associated with digital circuitry.

Accordingly, it is an object of the present invention to provide a reliable and easily maintainable digital downconverter circuit for use in a satellite communications demodulator. It is a further object to provide such a digital downconverter which simplifies the circuitry, increases stability by minimizing signal drift, increases known speeds of operation, and reduces the power requirements of corresponding analog devices.

SUMMARY OF THE INVENTION

A digital downconverter (DDC) circuit is provided for use in a demodulator of a satellite communications system. The demodulator also includes a demodulator front end circuit, and a finite impulse response (FIR) filter circuit and a timing circuit located downstream of the DDC circuit.

The input to the DDC front end circuit is a bandpass signal operating at an intermediate frequency (IF) which has been converted from a radio frequency (RF). This IF signal is processed by a bandpass filter, which provides a limited amount of IF filtering action useful in rejecting large and off-channel signals. The bandpass filter has a frequency response characteristic which filters the bandpass signal and isolates a portion of the signal to output a filtered bandpass signal. The filtered bandpass signal is a complex data carrying signal comprising an inphase (I) part and a quadrature (Q) part. The filtered bandpass signal is amplified by an amplifier whose degree of amplification is controlled by an automatic gain control (AGC) circuit. The amplifier and the automatic gain control circuit automatically monitor and adjust the amplitude of the analog bandpass signal. An A/D converter, operating at a sampling rate of a local baseband frequency, converts the amplitude-controlled analog bandpass signal into a digital signal prior to processing by the DDC circuit.

The entire DDC circuit 54 is implemented entirely in digital hardware, thereby eliminating the drift associated with typical analog downconverter circuits, while minimizing power requirements. In the preferred embodiment, the circuit is implemented on an ASIC (application specific integrated circuit) utilizing gallium arsenide (GaAs) technology.

The digital bandpass signal input to the DDC circuit from the A/D converter is fed to both the automatic gain control circuit and to a digital mixer device, which mixes this signal with a pair of baseband signals each of which is phase-shifted by 90 degrees with respect to the other (inphase and quadrature outputs). The mixer device includes a pair of mixers which mix (i) the inphase baseband signal with the A/D converter output and (ii) the quadrature baseband signal with the A/D converter. The mixing process introduces inphase and quadrature outputs at the baseband frequency centered around zero frequency. The output of the pair of mixers is thus data bearing combined baseband/bandpass inphase and quadrature signals.

The inphase and quadrature outputs are fed into separate half-band pre-filters, which roughly recover the baseband signal by filtering at the baseband frequency to reject as many frequencies outside the baseband as possible. The outputs of the half-band pre-filters are fed to downsampling circuits which operate at one-half the frequency of the 512 megahertz (MHz) frequency. The downsampling circuits sample every other data bit output by the half-band filters.

The downsampled output of the downsampling circuits are fed into anti-alias (low pass) filters which refine and complete the filtering process begun by the half-band pre-filters by cutting off any additional frequencies which may have creeped in during downsampling, or decimation, of the signal. The low pass filters also eliminate aliasing which is introduced into the bandpass signal by the A/D converter.

The combination of the half-band pre-filters and the low pass filters therefore recover baseband information from the combined baseband/bandpass signals output by the pair of mixers of the mixer device, while eliminating the effects of downsampling and aliasing on the signal. The outputs of the low pass filters are in turn are provided to rate select circuits, which are clocked at n samples per symbol, where n=2, 4, 6, 8, etc.

BRIEF DESCRIPTION OF THE DRAWINGS

FIGS. 8a and 8b, taken together, are a schematic diagram of the anti-alias low pass filters of the downconverter circuit of FIG. 5.

DETAILED DESCRIPTION OF THE PREFERRED EMBODIMENT

With reference now to the remaining drawings, the construction and operation of a preferred embodiment of the present invention will now be described.

Figure 1:
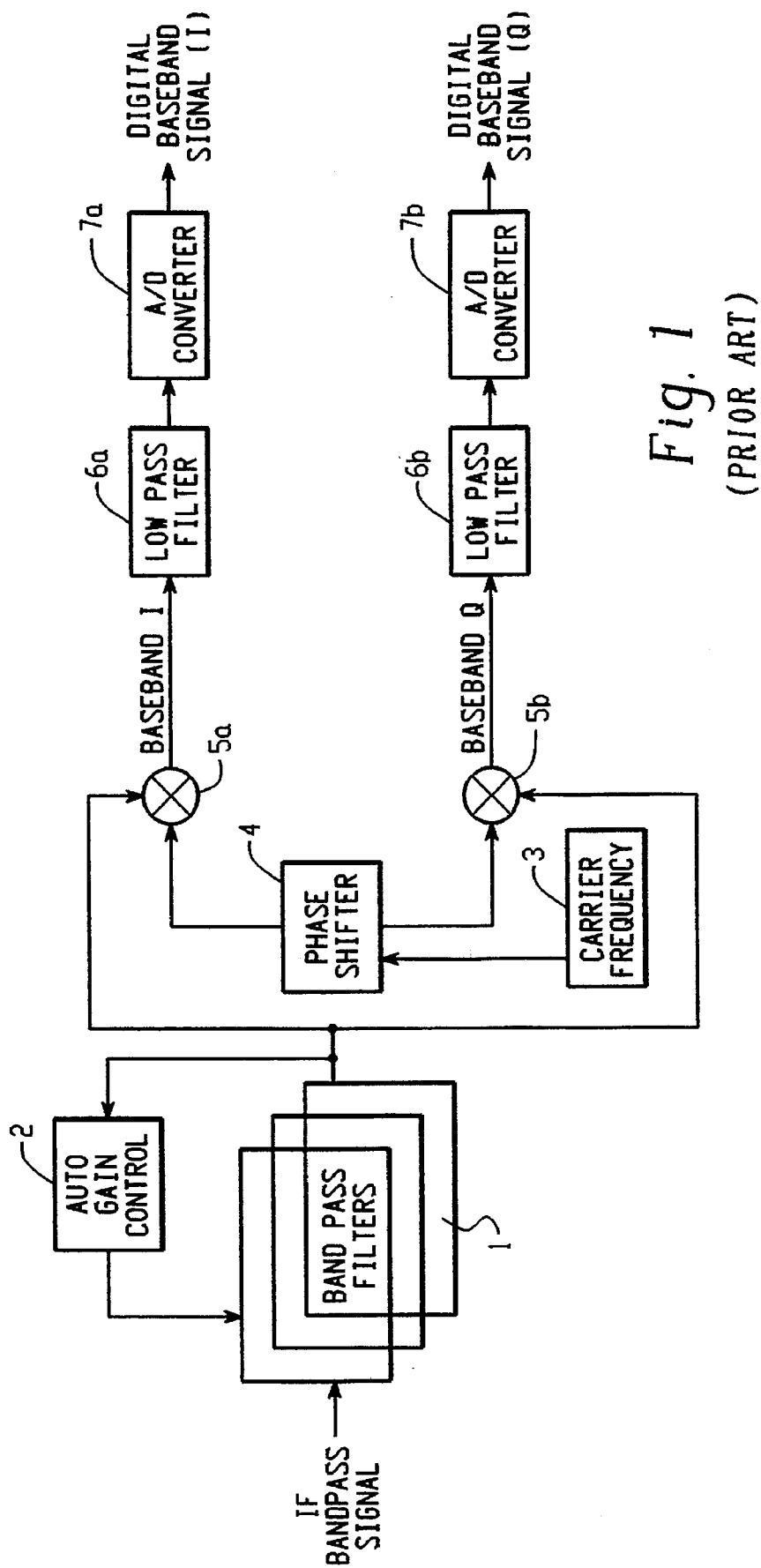
FIG. 1 is a high level block diagram of a known analog downconverter circuit.
Figure 2:
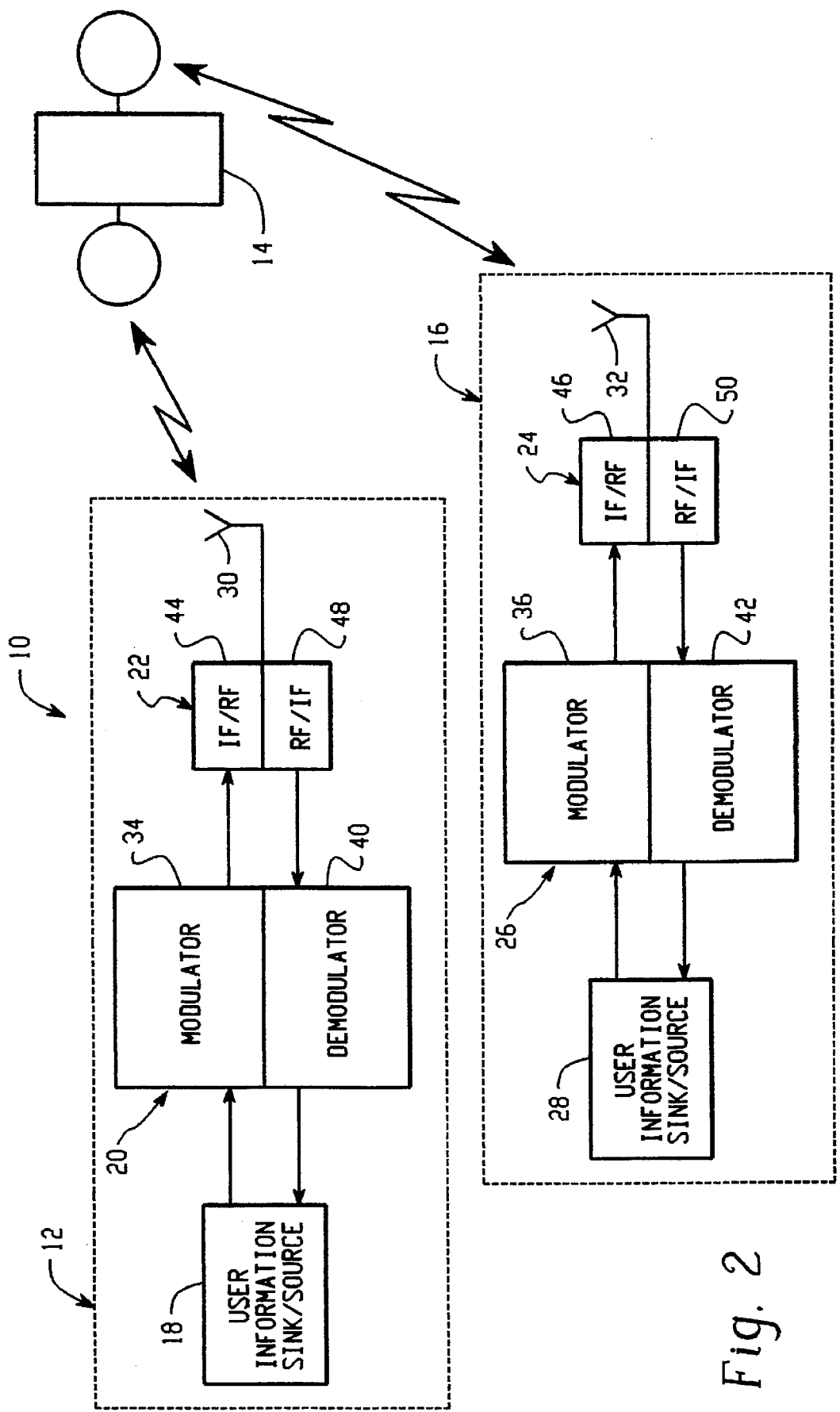
FIG. 2 is high level block diagram of a satellite communications system, including a pair of demodulators each of which includes a digital downconverter circuit constructed according to the principles of the present invention.

FIG. 2 shows a satellite communications system 10 constructed according to the principles of the present invention. The system 10 comprises a first transceiving unit 12, a satellite 14, and a second transceiving unit 16. The first transceiving unit 12 comprises a first user information sink/source 18, a first modulator/demodulator (modem) 20, and a first frequency converter 22. The second transceiving unit 16 comprises a second frequency converter 24, a second modem 26 and a second user information sink/source 28. The frequency converters 22 and 24 are provided with antennae 30 and 32, respectively, which facilitate signal transmission and reception to and from the satellite 14. Although the antennae 30 and 32 may take on several forms, a preferred embodiment is a very small aperture terminal (VSAT), which is typically a dish on the order of 1–3 feet (0.3–0.9 meter) in diameter.

The modems 20 and 26 in each of the transceiving units comprise a modulator 34 and 36, respectively, and a demodulator, 40 and 42, respectively. The modulators are used to modulate the signals generated by the user information sink/sources 18, 28, when these devices are functioning as a source. The demodulators are used to demodulate the signals destined for the user information sink/sources 18, 28 when these devices are functioning as a sink.

The frequency converters 22 and 24 in each of the transceiving units comprise an intermediate frequency (IF) to radio frequency (RF) converter 44 and 46, respectively, and an RF to IF converter, 48 and 50, respectively. The IF to RF converters convert the modulator output from an intermediate frequency to a radio frequency, when the transceiver is in a transmitting mode, thereby transmitting information to the satellite 14. The RF to IF converters convert the radio signal output by the satellite 14 from a radio frequency to an intermediate frequency, when the transceiver is in a receiving mode, thereby receiving information from the satellite 14. In the preferred embodiment, the RF is in the gigahertz (GHz) range, and the IF is in the megahertz (MHz) range.

Both the first transceiving unit 12 and the second transceiving unit 16 may operate in either the transmitting mode or the receiving mode. Accordingly, to simplify the following description of the satellite communications system 10, FIG. 3 and the accompanying description assume that the first transceiving unit 12 operates only in the transmitting mode and the second transceiving unit 16 operates only in the receiving mode. It is to be understood, however, that this selection of modes for the first and second transceiving unit is completely arbitrary and is made only for purposes of simplification of description.

The satellite communications system of FIG. 3 operates as follows. The user information source 18, which can be a device which provides digital information such as digital voice, video, facsimile or computer data, provides a signal in the form of a digital data stream operating at a baud rate of between one and sixteen megabits (Mbs) per second. The modulator 34 receives the signal from the user information source 18 and performs pulse shaping and signal processing functions to combine the shaped digital data stream with an analog (sinusoidal) IF carrier signal to provide a data bearing information signal operating at the carrier frequency. The output of the modulator is therefore an analog signal in the IF range. In the preferred embodiment of the present invention, the IF signal is output at a frequency of 52–176 megahertz (MHz). The IF to RF converter 44 then converts the IF analog signal to an RF signal which is transmitted to the satellite 14 via the antenna 30 on the IF to RF frequency converter 22.

The satellite 14 receives the radio signal transmitted by the antenna 30 and retransmits an RF signal to the receiving unit 16 which is received by the antenna 32 on the RF to IF frequency converter 50. The RF to IF converter 32 converts the radio frequency signal to a 52–176 MHz analog signal which is applied to the demodulator 42. The demodulator 42 performs signal processing functions and converts the IF analog signal to a digital signal. The digital signal, in the range of 1–16 MBPS, is provided to the user information sink 28.

Figure 3:
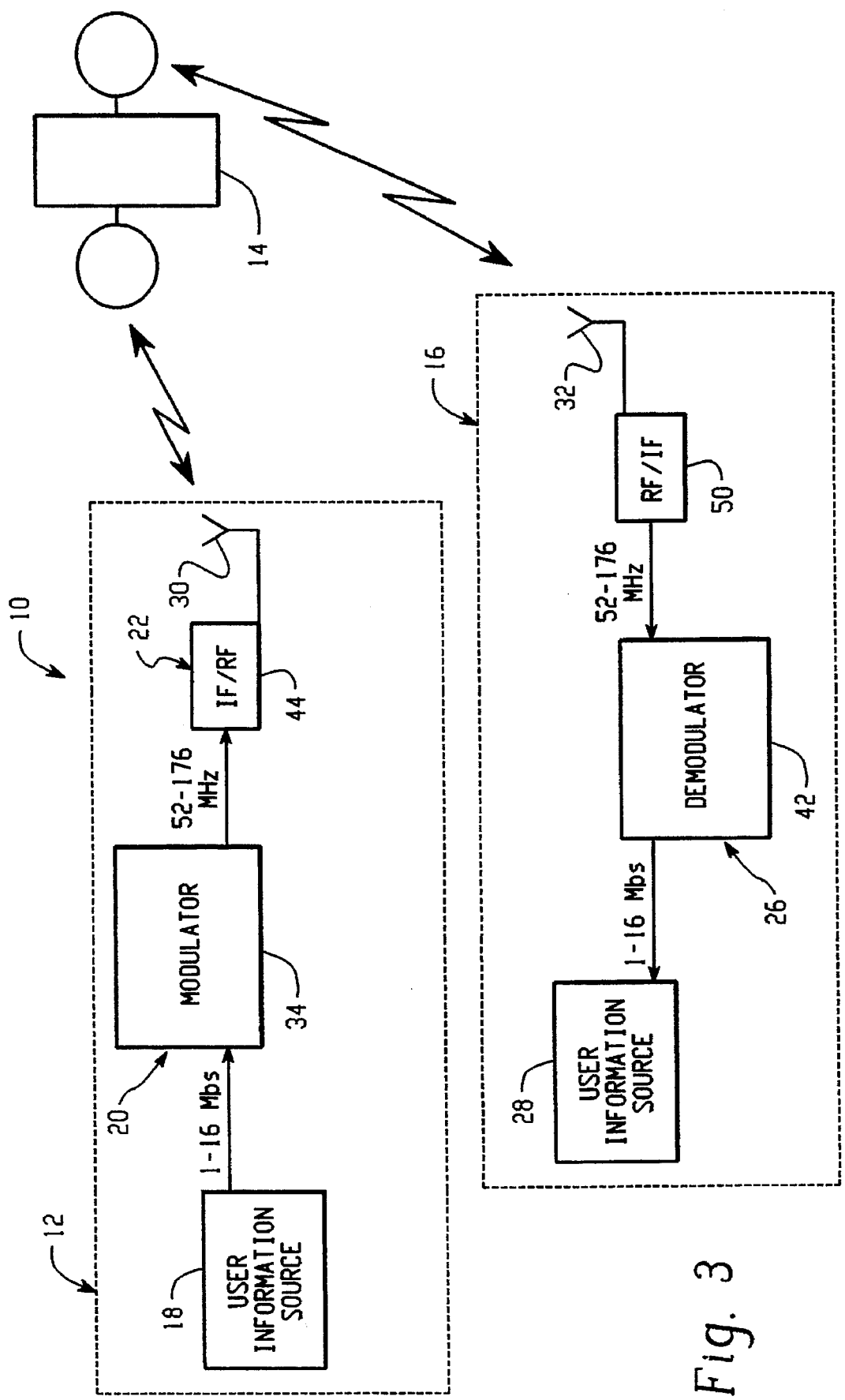
FIG. 3 is a simplified high level block diagram of the satellite communications system of FIG. 2, showing only a single demodulator.
Figure 4:
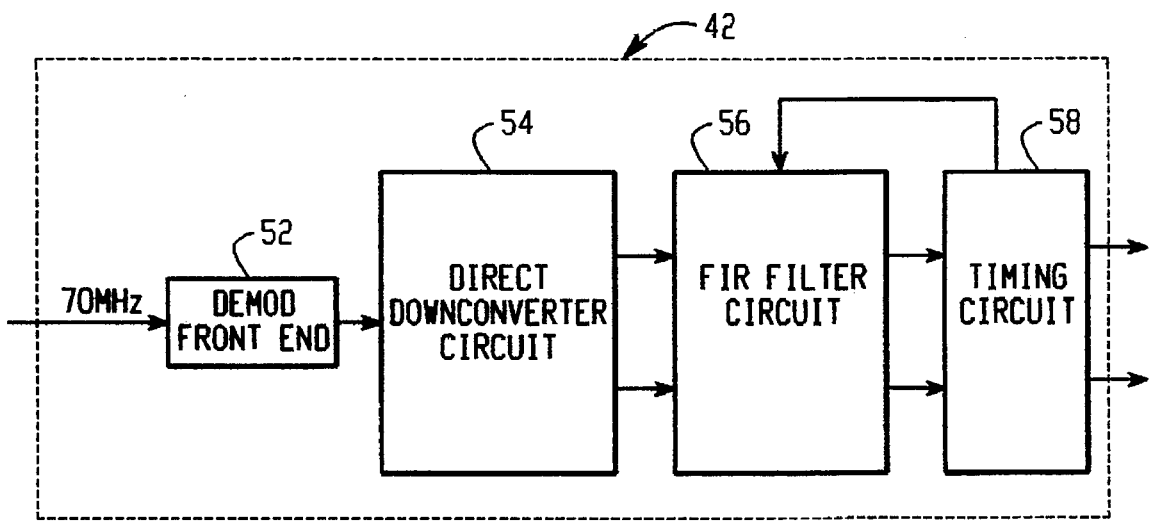
FIG. 4 is a functional block diagram of the demodulator shown in FIGS. 2 and 3.

As shown in FIG. 4, the demodulator 42 of FIG. 3 comprises a demodulator front end circuit 52, a direct downconverter (DDC) circuit 54, a finite impulse response (FIR) filter circuit 56, and a timing circuit 58. The demodulator front end circuit 52 pre-conditions the received bandpass signal for the DDC circuit 54. The DDC circuit converts the IF bandpass signal to a baseband signal for further processing by the FIR filter circuit 56. The timing circuit 58 provides timing information which is used by the FIR filter circuit 56 in performing this further processing.

Figure 6A:
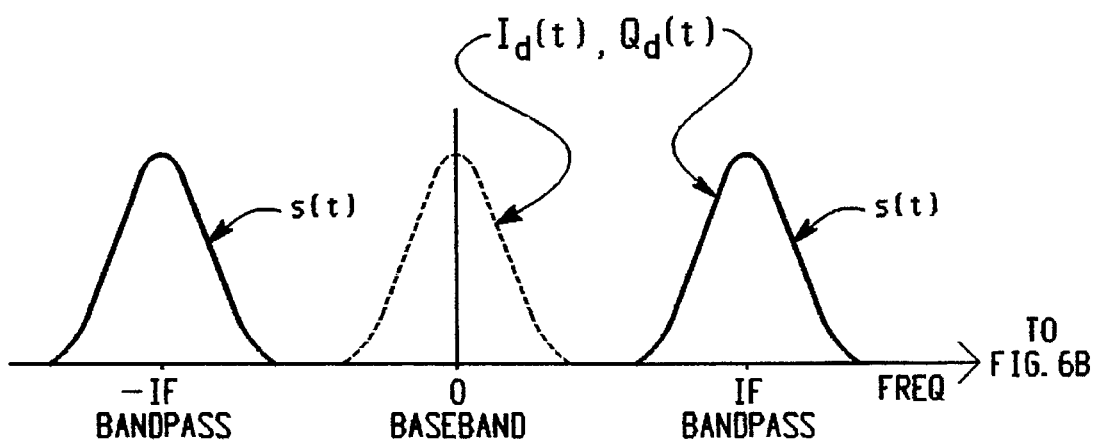
FIGS. 6a and 6b, taken together, are a graphical representation of the input and output signals processed by the direct downconverter circuit of FIG. 5.
Figure 6B:
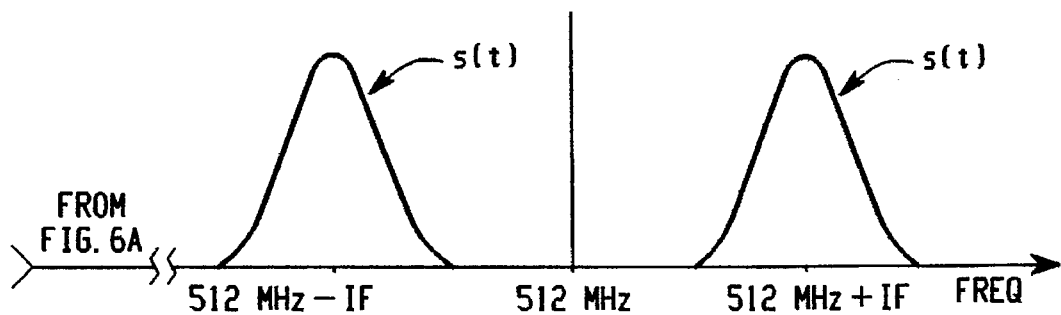
Figure 5:
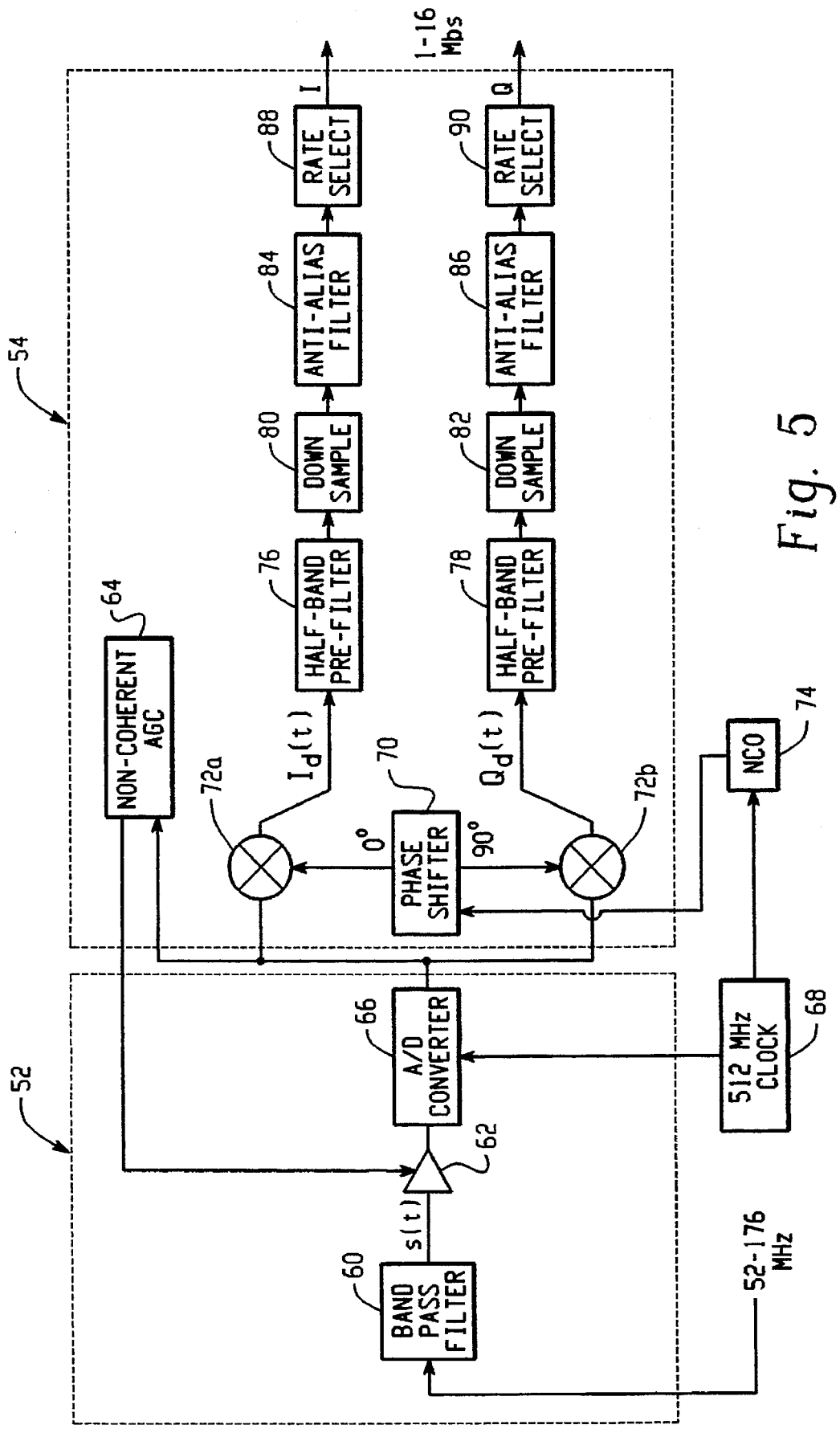
FIG. 5 is a more detailed view of the front end and direct downconverter circuits of the demodulator of FIG. 4.

A shown in FIG. 5, the input to the DDC front end circuit 52 is the IF analog signal output by the RF-to-IF converter 50. This signal is processed by a bandpass filter 60, which provides a limited amount of IF filtering action useful in rejecting large and off-channel signals. The bandpass filter 60 has a frequency response characteristic which filters the bandpass signal and isolates a portion of the signal to output a filtered bandpass signal. The 52–176 MHz filtered bandpass analog IF signal output by the bandpass filter 60 is represented in FIGS. 6a and 6b as s(t). As shown in FIGS. 6a and 6b, the filtered bandpass signal s(t) is represented by a frequency spectrum centered (i) on either side of zero frequency at frequency IF and –IF, wherein IF is the 52–176 MHz signal, and (ii) on either side of 512 MHz at frequency 512 MHz+IF and 512 MHz–IF. The filtered bandpass signal s(t) is a complex data carrying signal comprising an inphase (I) part and a quadrature (Q) part. The single bandpass filter 60, unlike prior art downconverter circuits (e.g., U.S. Pat. No. 5,191,305), eliminates the need for a bank of bandpass filters. Further digital filtering is performed by the DDC circuit 54 itself.

Figure 9A:
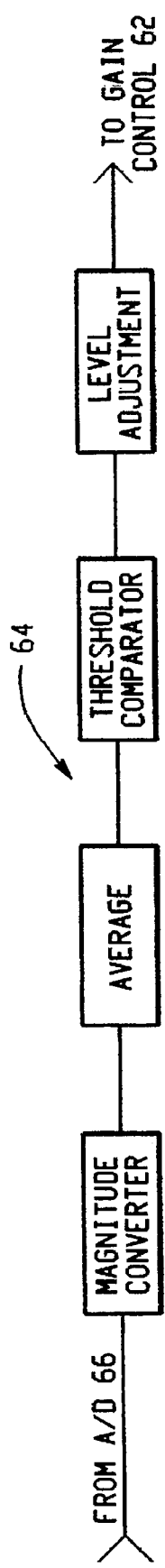
FIGS. 9a and 9b show functional and schematic representations, respectively, of the automatic gain control circuit of the downconverter circuit of FIG. 5.
Figure 9B:
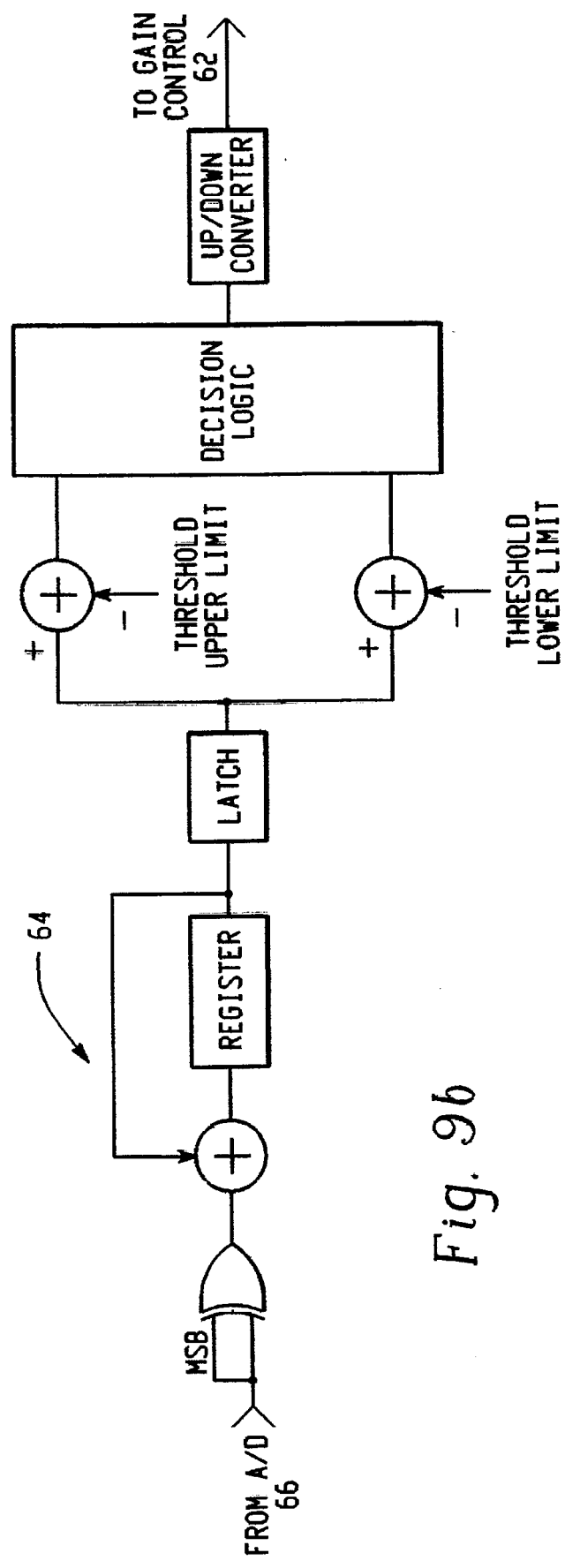

The filtered bandpass signal is amplified by an amplifier 62. The degree of amplification is controlled by an automatic gain control (AGC) circuit 64 located within the DDC circuit 54 so as to provide an analog signal of somewhat constant amplitude to an analog-to-digital (A/D) converter 66. The AGC circuit 64 could also be implemented off of the DDC circuit 54, for example, within the DDC front end circuit 52. The amplifier 62, in conjunction with the automatic gain control circuit 64, automatically monitors and adjusts the amplitude of the analog bandpass signal s(t). The automatic gain control circuit 64 may be constructed according to the principles set forth in U.S. Pat. No. 5,095,533 to Loper et al., incorporated by reference herein. Alternatively, the automatic gain control circuit 64 may be constructed functionally and schematically as shown in FIGS. 9A and 9B, respectively, wherein the signal level magnitude is detected, and the gain is adjusted accordingly.

The A/D converter 66 converts the amplitude-controlled analog bandpass signal into a digital signal prior to it being processed by the DDC circuit 54. The A/D converter 66, operating at a sampling rate of 512 MHz provided by local carrier clock 68, samples the signal s(t) and outputs a digital output signal to the DDC circuit 54. The output signal of the A/D converter is a multiple bandpass signal which (i) is centered on either side of zero frequency at frequency IF and –IF, and (ii) is centered on either side of local carrier frequency 512 MHz at 512 MHz±IF.

The entire DDC circuit 54 is implemented entirely in digital hardware. In the preferred embodiment, the circuit is implemented on an ASIC (application specific integrated circuit) utilizing gallium arsenide (GaAs) technology. Because the DDC circuit 54 is implemented entirely in digital hardware, the drift associated with typical analog downconverter circuits is eliminated, power requirements are minimized, as compared to known downconverter circuits.

The digital bandpass signal input to the DDC circuit 54 from the A/D converter 66 is fed to both the automatic gain control circuit 64 and to a mixer device comprising mixers 72a and 72b. A phase rotation device (phase shifter 70) is controlled by a numerically controlled oscillator (NCO) 74 which is clocked by the 512 MHz clock 68. The phase shifter device 70 outputs a pair of baseband signals each of which is phase-shifted by 90 degrees with respect to the other (inphase and quadrature outputs). These inphase and quadrature baseband signals are mixed with the digital bandpass signal output by the A/D converter 66 at the mixer device 72a, 72b.

The pair of mixers, 72a and 72b, respectively, mix (i) the inphase baseband signal with the A/D converter output and (ii) the quadrature baseband signal with the A/D converter. The mixing process introduces inphase and quadrature outputs at the baseband frequency centered around zero frequency. The output of the pair of mixers is thus the inphase and quadrature data bearing combined baseband/bandpass signals, $I_d(t)$ and $Q_d(t)$, respectively (see FIG. 6). The baseband inphase and quadrature components formed as a result of the mixing process allow the signal to be filtered and further processed to recover the baseband information.

The inphase and quadrature outputs, $I_d(t)$ and $Q_d(t)$, are fed into separate half-band pre-filters 76 and 78, respectively. The half-band pre-filters operate at the local carrier frequency of 512 MHz. The half-band pre-filters 76 and 78 roughly recover the baseband signal by filtering at 256 MHz to reject as many frequencies outside the baseband as possible.

Figure 7:
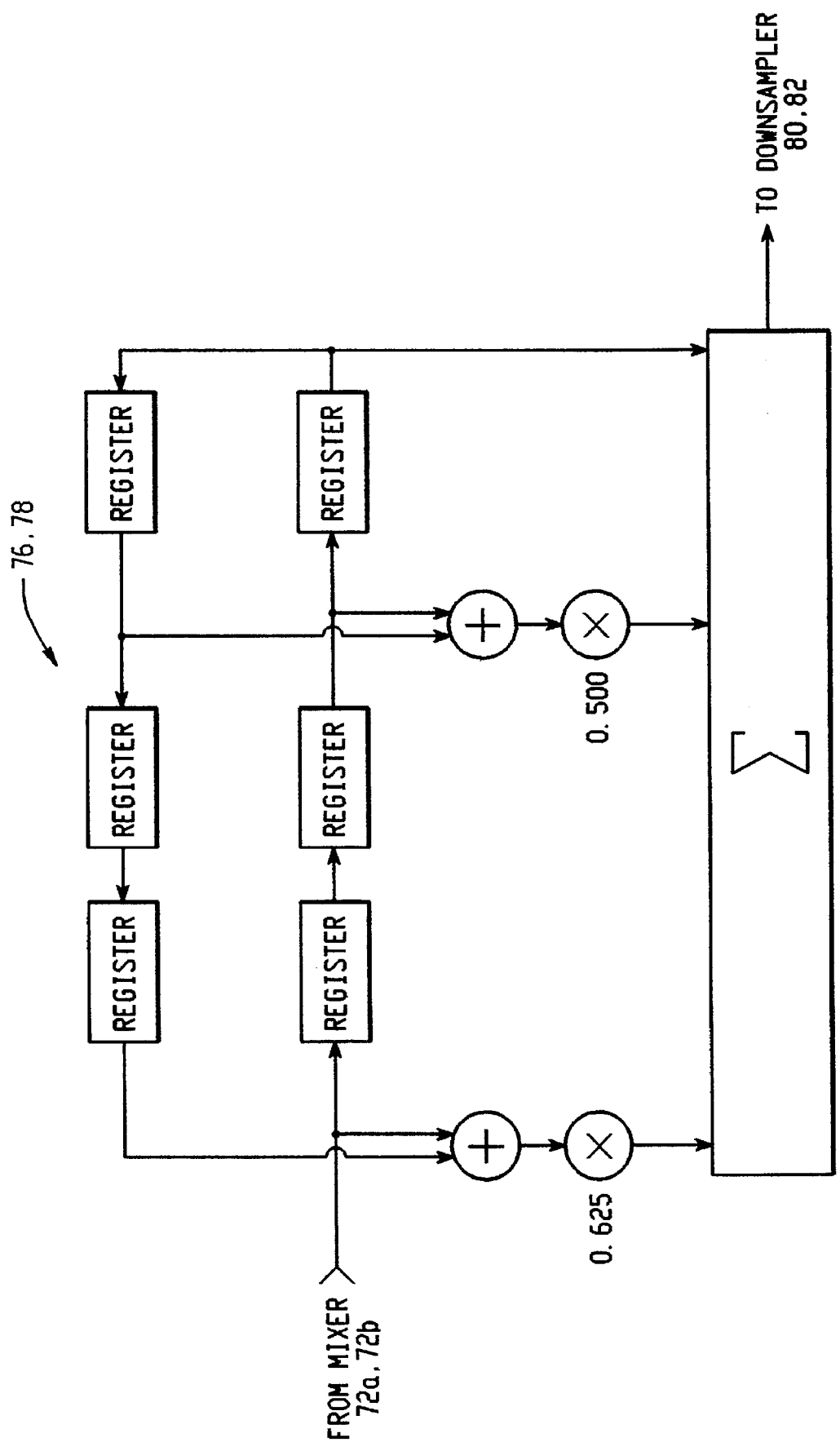
FIG. 7 is a schematic diagram of the half-band pre-filters of the downconverter circuit of FIG. 5.

An implementation of the half-band filters 76 and 78 is shown in FIG. 7. In effect, the half-band filters 76 and 78 operate as 512 Mhz adders. The outputs of the half-band pre-filters 76 and 78 are fed, respectively, to downsampling circuits 80 and 82. The downsampling circuits 80 and 82 operate at one half the frequency of the local carrier frequency of 512 MHz, or 256 MHz. The downsampling circuits sample every other data bit output by the half-band pre-filters.

The downsampled output of the downsampling circuits 80 and 82 are fed, respectively, into anti-alias (low pass) filters 84 and 86. The low pass filters refine and complete the filtering process begun by the half-band pre-filters by cutting off any additional frequencies which may have creeped in during downsampling, or decimation, of the signal.

The low pass filters also eliminate aliasing which is introduced into the bandpass signal by the A/D converter 66. As explained above, the output signal of the A/D converter 66 (FIG. 5) fed into the DDC circuit 54 is a multiple bandpass signal which (i) is centered on either side of zero frequency at frequency IF and –IF, and (ii) is centered on either side of local carrier frequency 512 MHz at 512 MHz±IF. Accordingly, the low pass filters 84 and 86 must eliminate the portion of the signal which is centered on either side of frequency 512 MHz at 512 MHz±IF (also known as aliasing error).

An implementation of the anti-aliasing low pass filters 84 and 86 is shown in FIGS. 8a and 8b. The low pass filters 80 and 82 are constructed in a multi-pole implementation, unlike prior art low pass filters which are of a single pole implementation. The low pass filters 80 and 82 have corners (cut-off frequencies) which independently operate on the outputs of the half-band pre-filters 76 and 78 and serve to suppress additional frequencies resulting from RF mixing and other higher frequency signals without significantly affecting the baseband signal components. The low pass filters are designed to limit the demodulation bandwidth in this manner.

The output of the low pass filters, respectively, are digital baseband signals I and Q. The combination of the half-band pre-filters 74 and 76 and the low pass filters 84 and 86, therefore, recover baseband information from the combined baseband/bandpass signals, $I_d(t)$ and $Q_d(t)$, output by the pair of mixers 72a, 72b, while eliminating the effects of downsampling and aliasing on the signal.

The 128 MHz outputs of the low pass filters are in turn are provided to rate select circuits 88 and 90. The rate selection circuits operate to sample the 128 MHz signal at either n samples/symbol (n=2, 4, 6, 8, etc.). At a sampling rate of 8 samples/symbol, the rate selection circuits operate at their maximum speed of 128 MHz. Sampling can also occur at 2 samples/symbol, in which case the rate selection circuits operate at their minimum speed of 32 MHz.

The inphase and quadrature outputs of the DDC circuit 54, at the outputs of the rate select circuits 88 and 90, are then made available to FIR filter circuit 56 (refer back to FIG. 4). The FIR filter circuit is also clocked at a speed of 8 MHz to 128 MHz.

Accordingly, the preferred embodiment of a digital downconverter circuit for a digital data transmission system has been described. With the foregoing description in mind, however, it is understood that this description is made only by way of example, that the invention is not limited to the particular embodiments described herein, and that various rearrangements, modifications and substitutions may be implemented without departing from the scope of the invention as hereinafter claimed.

We claim:

1. A digital downconverter circuit for a digital data transmission system, comprising:

an input for receiving an analog intermediate frequency (IF) carrier signal onto which baseband information has been modulated;

a bandpass filter circuit for filtering said received analog IF carrier signal and outputting a bandpass analog IF signal;

an analog-to-digital converter for converting said bandpass analog IF signal into a bandpass digital IF signal;

a phase shifter device for outputting a complex pair of phase shifted baseband signals operating at a local baseband frequency;

a digital mixer device for mixing said bandpass digital IF signal separately with each of said complex pair of phase shifted baseband signals and outputting a complex combined baseband/bandpass signal comprising in-phase and quadrature components;

filtering circuitry for recovering baseband information from said in-phase and quadrature components of said complex combined baseband/bandpass signal and outputting information-bearing in-phase and quadrature baseband signals, said filtering circuitry including a half-band pre-filter and a low pass filter; and sampling circuitry operating at a predetermined sampling frequency for sampling said information-bearing recovered baseband signals and outputting a sampled complex baseband output signal.

2. The digital downconverter circuit of claim 1, wherein said bandpass filter circuit consists of a single bandpass filter.

3. The digital downconverter circuit of claim 2, wherein said low pass filter is implemented in a multi-pole configuration.

4. The digital downconverter circuit of claim 1, further comprising a downsampling circuit interposed between said half-band pre-filter and said low pass filter.

5. The digital downconverter circuit of claim 4, wherein said downsampling circuit samples every other sample output by said half-band pre-filter to provide said low pass filter with a signal operating at half the frequency of that which is input to said half-band pre-filter.

6. The digital downconverter circuit of claim 1, wherein said analog-to-digital converter operates at said sampling frequency.

7. The digital downconverter circuit of claim 6, wherein said sampling frequency operates at about 512 megahertz (MHz) and said analog intermediate frequency (IF) carrier signal operates at between 52 megahertz (MHz) and 176 megahertz (MHz).

8. The digital downconverter circuit of claim 7, wherein said IF carrier signal operates at between 52 megahertz (MHz) and 176 megahertz (MHz).

9. The digital downconverter circuit of claim 1, wherein said phase shifter device, said mixer device, said filtering circuitry, and said sampling circuitry are implemented on an application specific integrated circuit (ASIC).

10. The digital downconverter circuit of claim 9, wherein said ASIC utilizes gallium arsenide (GaAs) technology.

11. The digital downconverter circuit of claim 9, wherein said pair of phase shifted baseband signals are phase shifted by ninety degrees.

12. The digital downconverter circuit of claim 11, further comprising an automatic gain control circuit for controlling the amplitude of said bandpass analog IF signal prior to its being converted into said bandpass digital IF signal.

13. The digital downconverter circuit of claim 11, wherein said sampling circuitry operates to sample between two and eight samples per data symbol passing therethrough.

14. The digital downconverter circuit of claim 13, wherein said sampled complex baseband output signal operates at between one and sixteen megabits per second.

15. A method for recovering baseband information from a carrier signal which has been modulated onto an intermediate frequency (IF) carrier signal, the method comprising the steps of:

receiving an analog intermediate frequency (IF) carrier signal onto which baseband information has been modulated;

filtering said received analog IF carrier signal using a bandpass filter circuit and outputting a bandpass analog IF signal;

converting said bandpass analog IF signal into a bandpass digital IF signal using an analog-to-digital converter;

outputting a complex pair of phase shifted baseband signals operating at a local baseband frequency using a phase shifter device;

mixing said bandpass digital IF signal, using a digital mixer device, separately with each of said complex pair of phase shifted baseband signals and outputting a complex combined baseband/bandpass signal comprising in-phase and quadrature components;

recovering, using filtering circuitry including a half-band pre-filter and a low pass filter, said baseband information from said in-phase and quadrature components of said complex combined baseband/bandpass signal, and outputting information-bearing in-phase and quadrature baseband signals; and sampling said information-bearing recovered baseband signals using sampling circuitry operating at a sampling frequency and outputting a sampled complex baseband output signal.

16. The method of claim 15, wherein said bandpass filter circuit consists of a single bandpass filter.

17. The method of claim 15, wherein said low pass filter is implemented in a multi-pole configuration.

18. The method of claim 15, further comprising the step of sampling every other sample output by said half-band pre-filter to provide said low pass filter with a signal operating at half the frequency of that which is input to said half-band pre-filter.

19. The method of claim 15, further comprising the step of operating said analog-to-digital converter at said local baseband frequency.

20. The method of claim 19, wherein said sampling frequency operates at about 512 megahertz (MHz) and said analog intermediate frequency (IF) carrier signal operates at between 52 megahertz (MHz) and 176 megahertz (MHz).

21. The method of claim 20, wherein said IF carrier signal operates at between 52 megahertz (MHz) and 176 megahertz (MHz).

22. The method of claim 15, wherein said phase shifter device, said mixer device, said filtering circuitry, and said sampling circuitry are implemented on an application specific integrated circuit (ASIC).

23. The method of claim 22, wherein said ASIC utilizes gallium arsenide (GaAs) technology.

24. The method of claim 19, wherein said pair of phase shifted baseband signals are phase shifted by ninety degrees.

25. The method of claim 19, further comprising the step of automatically controlling the gain of the amplitude of said bandpass analog IF signal prior to its being converted into said bandpass digital IF signal.

26. The method of claim 19, wherein said sampling circuitry operates to sample between two and eight samples per data symbol passing therethrough.

27. The method of claim 26, wherein said sampled complex baseband output signal operates at between one and sixteen megabits per second.

* * * * *